J. WILSON, C. GREEN & W. WILSON, Jr.
Seaming-Machines.
No. 6,097. Reissued Oct, 20, 1874.
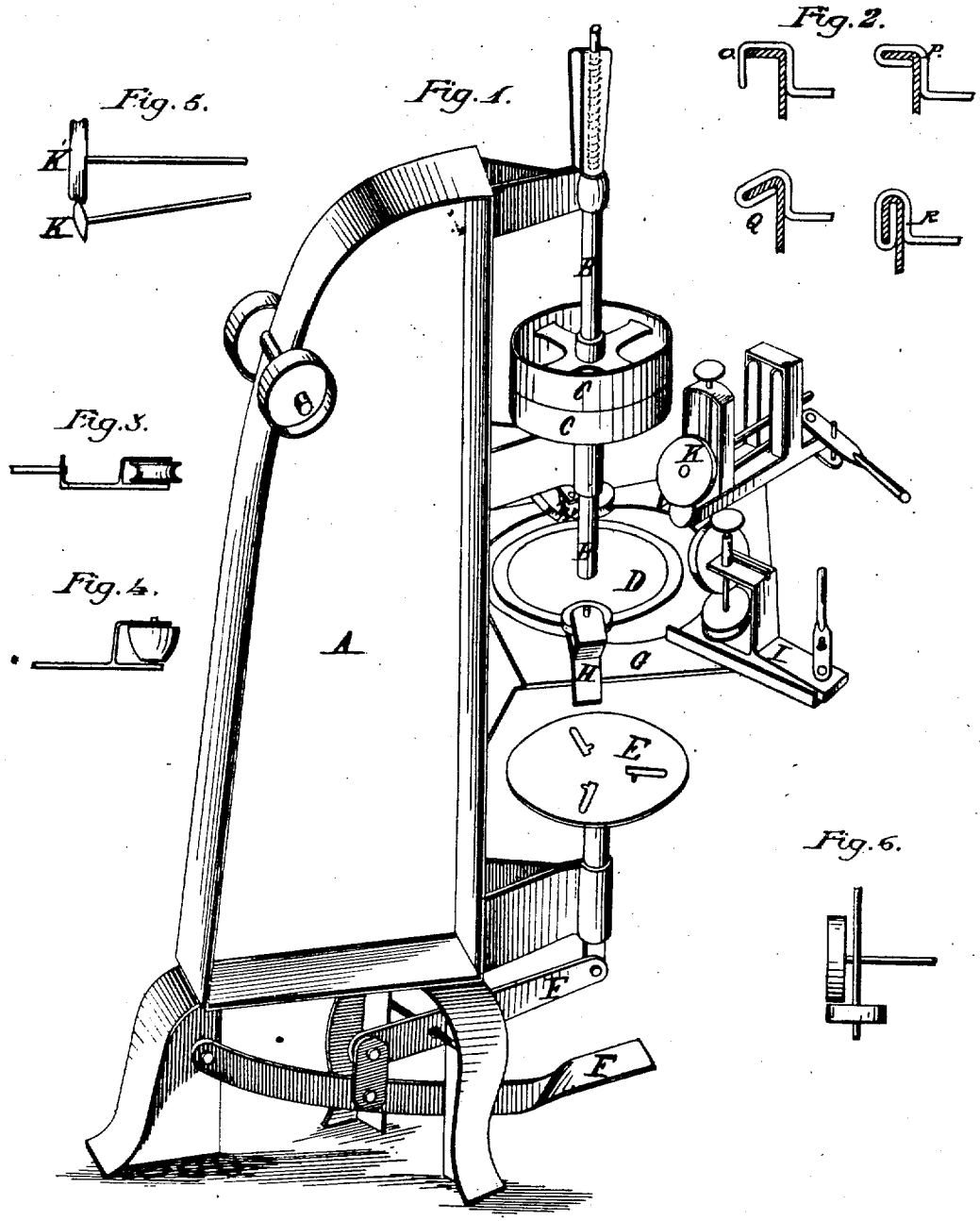
Witnesses:
James L. Norris,
Chas. L. Coombs
Inventor:
James Wilson,
Charles Green,
William Wilson, Jr.,
by their Atty,
Horace Binney, 3rd.
THE GRAPHIC CO. PHOTO-LITH. 39 & 41 PARK PLACE, N.Y.

UNITED STATES PATENT OFFICE.

JAMES WILSON, CHARLES GREEN, AND WILLIAM WILSON, JR., OF WILMINGTON, DELAWARE.

IMPROVEMENT IN SEAMING-MACHINES.

Specification forming part of Letters Patent No. 23,735, dated April 19, 1859; extended seven years; reissue No. 6,097, dated October 20, 1874; application filed September 16, 1874.

*To all whom it may concern:*

Be it known that we, JAMES WILSON, CHARLES GREEN, and WILLIAM WILSON, Jr., of the city of Wilmington, in the county of New Castle and State of Delaware, have invented a certain Improved Double-Seaming-Machine, of which the following is a specification:

This invention has for its object the formation of seams, either single or double, upon one or both ends of metal kegs or cans and upon their exterior surface without the use of any tool or former being used on their interior during the operation; and the invention consists, first, in the combination of two yielding plates or disks, which are set in a machine with their faces opposite to and parallel with each other, and so arranged that one or both may be moved toward and from each other for the purpose of seizing and holding between them a can or vessel whose heads are to be attached and seamed into its body; and, second, in the combination with these plates and disks of seaming-tools for the purpose of folding down the flanges which form the seams.

The first part of the invention is very useful for the purpose proposed, because it would be difficult to hold the vessel by hand when the seaming was to be done, and to place it on a mandrel would only enable the operator to work one head, and that with difficulty because the pressure would tend to lift off the head rather than to hold it in its place; but by this combination, when the two heads are laid on the vessel so as to cover its open ends, and they are grasped by the pressure of the plates, the heads can both be seamed in without leaving any hole in the vessel for the purpose of inserting a tool to aid in the operation.

The second part of the invention, which consists in the combination of the plates with tools for forming the seams, makes the machine operative without requiring much skill in the workman and greatly improves its efficiency.

In the accompanying drawings, Figure 1 is a sectional elevation of the machine. Fig. 2 represents different forms of the seams in the process of being completed. Figs. 3, 4, 5, and 6 are views of the various rollers used in the entire operation.

Hitherto it has been possible to form a seam, either single or double, upon one end of a metal can or keg by inserting therein a suitable tool, over which the seam is to be formed; but by the use of our inventions both ends or heads may be seamed externally, and without the necessity of leaving any hole in either of the heads for the introduction of tools to assist in the work.

A machine which exhibits our invention consists of a stand or frame, as at A, upon which is mounted a vertical shaft, B B, upon which are tight and loose pulleys C C. Upon the lower end of said shaft is a metallic plate, D, and directly underneath it is mounted a second plate, E, whose axis is concentric with the axis B B, and it is so connected with a treadle, as at F, as to be readily elevated or depressed. At the upper end of the shaft B B is a spring or other contrivance for the purpose of pressing the upper disk downward. At G is shown a stand for supporting the several disks or wheels required in turning the seams, as shown at H, I, K, and F. The first one required in the operation is the single burring-tool shown at H, and consists of a single wheel or disk, so beveled at its lower edge as to press down the flange of the head over the end of the keg, as seen at O in Fig. 2. The peaning-down wheels are shown at I, and are simply two small wheels placed at right angles to each other, as seen at Fig. 6, and their use is to press the flange bent by the burring-tool, as left at O, down firmly upon the under side of the flange, which is formed on the end of the keg, as shown at P, Fig. 2, and which will produce a single seam. Next comes the double burring-wheels, as at K, and they consist of two wheels, whose axes are nearly parallel to each other, but the upper and larger wheel has a groove in its edge, in which the smaller and lower wheel K works. The axis of the lower wheel, as shown in the drawings, is slightly inclined to that of the upper one, and by the combined action of the two upon the flange already bent to the form shown at P a second bend is produced similar to that shown at Q, Fig. 2. Then the work is ready for the finishing-wheel, which is shown at L, and at Fig. 3, and is simply a grooved wheel, the function of which is to press the partially-formed joint firmly against the side of the cylinder, as shown at R, Fig. 2.

The operation is as follows: An open-ended vessel, of sheet metal or other suitable material, is first made either plain or corrugated, and provided with a flange upon each end, like that shown in section at O and P, Fig. 2. Two heads are then struck up in any suitable manner, as by dies or otherwise, and upon them are left flanges of equal or greater width than those upon the cylinder. The vessel with the heads in position thereon is then placed between the two plates D and E, and by pressure applied upon the treadle at F the lower plate E is pressed firmly upward, and thereby holds the vessel tightly between them. One of the plates is made to revolve, and to carry with it the vessel which is grasped between it and the opposite plate, which also revolves with the vessel, so that all parts of the flange are successively presented to the action of the tools which are to perform the operation of seaming. When the tools are to be used they are all withdrawn from contact with the flange, and then the burring-tool at H is first forced in by the hand-lever, so as to operate upon the flange, and to press it down into the form shown at O, Fig. 2. Then the finishing-tool may be used if only a single seam is to be produced; but if a double seam is required, then the second set or tool is brought to bear or to act upon the flange which presses it down firmly, as shown at P, Fig. 2, when they are withdrawn, and the third set, as at K, are brought into action, and which acts like a double burring-tool to form a second flange, having an acute angle with the side of the cylinder. These are then withdrawn, and the seam is finished by the fourth tool, as at L, which makes a seam like that shown in section at R, Fig. 2. The vessel is then inverted, and the other head is fastened in in the same manner, and in this way a single or double seam is produced externally on both ends of the vessel, without the necessity of introducing any tool into the interior.

We therefore claim—

1. The combination of the two yielding plates or disks D and E, for the purpose of supporting the vessel in forming a seam from the outside, substantially as described.

2. The arrangement of the two yielding disks D and E upon rotating shafts, so that they can be rotated to bring all parts of the flange under the action of the seaming-tools, for the purpose of forming an exterior seam, substantially as described.

3. The combination of the two yielding disks D and E, with one or more of the tools, as shown at H, I, K, or L, for the purpose of forming seams externally upon metal kegs or cans, substantially as described.

4. In a machine for exterior seaming, the combination of the two yielding disks D and E, and the treadle F, for operating the disks, which hold the can or keg during the operation of exterior seaming, substantially as described.

JAMES WILSON.
CHARLES GREEN.
WM. WILSON, JR.

Witnesses:
W. R. BRINCKLE,
WM. DONNELLY.